(12) United States Patent
Berger et al.

(10) Patent No.: US 11,630,265 B2
(45) Date of Patent: Apr. 18, 2023

(54) GLASS FIBER HOLE PLATES FOR 2D FIBER COLLIMATORS AND METHODS FOR ALIGNMENT AND FABRICATION FOR OPTICAL SWITCHING APPLICATIONS

(71) Applicant: Google LLC, Mountain View, CA (US)

(72) Inventors: Jill Berger, Saratoga, CA (US); Kevin Yasumura, Lafayette, CA (US); Steven M. Swain, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/849,484

(22) Filed: Apr. 15, 2020

(65) Prior Publication Data

US 2021/0325612 A1 Oct. 21, 2021

(51) Int. Cl.
  *G02B 6/35* (2006.01)
  *G02B 6/32* (2006.01)
  *G02B 6/36* (2006.01)

(52) U.S. Cl.
  CPC .......... *G02B 6/3518* (2013.01); *G02B 6/322* (2013.01); *G02B 6/3556* (2013.01); *G02B 6/3584* (2013.01); *G02B 6/3644* (2013.01); *G02B 6/3688* (2013.01)

(58) Field of Classification Search
  CPC ............. G02B 6/35; G02B 6/322; G02B 6/36
  See application file for complete search history.

(56) References Cited

U.S. PATENT DOCUMENTS

| | | | |
|---|---|---|---|
| 6,415,086 B1 * | 7/2002 | Hirsch | C03C 25/68 359/900 |
| 6,456,753 B1 | 9/2002 | Gee et al. | |
| 6,489,589 B1 | 12/2002 | Alexander | |
| 6,549,703 B1 * | 4/2003 | Tanielian | G02B 6/3524 359/210.1 |
| 7,266,282 B2 | 9/2007 | Qiu et al. | |

(Continued)

FOREIGN PATENT DOCUMENTS

| | | |
|---|---|---|
| CN | 102165350 A | 8/2011 |
| CN | 109923454 A | 6/2019 |
| EP | 1331497 A2 | 7/2003 |
| WO | 2011145785 A1 | 11/2011 |
| WO | 2018164954 A1 | 9/2018 |

OTHER PUBLICATIONS

Daniel S. Correa, Juliana M. P. Almeida, Gustavo F. B. Almeida, Marcos R. Cardoso, Leonardo De Boni and Cleber R. Mendonça, Ultrafast Laser Pulses for Structuring Materials at Micro/Nano Scale: FromWaveguides to Superhydrophobic Surfaces, Jan. 31, 2017, 26 pages.

(Continued)

*Primary Examiner* — Tina M Wong
(74) *Attorney, Agent, or Firm* — Lerner, David, Littenberg, Krumholz & Mentlik, LLP

(57) ABSTRACT

An optical circuit switch including a two-dimensional fiber collimator includes a hole plate to hold and align a plurality of optical fibers. Fiber pathways within the hole plate can be formed using a femtosecond laser irradiation chemical etching (FLICE) technique. The use of the FLICE technique allows for extremely precise channels to be formed which allows for fibers to be aligned more closely with their intended alignment. The technique also allows for the channels or fiber pathways to be formed in a thicker material, which allows for greater structural support and robustness of the fiber collimator in use.

19 Claims, 12 Drawing Sheets

(56) References Cited

U.S. PATENT DOCUMENTS

| | | | | |
|---|---|---|---|---|
| 8,538,215 | B2* | 9/2013 | Deliwala | G02B 6/423 385/52 |
| 9,726,824 | B1* | 8/2017 | Berger | G02B 6/3594 |
| 2002/0176668 | A1* | 11/2002 | Rubino, Jr. | G02B 6/3861 385/76 |
| 2002/0197047 | A1* | 12/2002 | Basavanhally | G02B 6/3644 385/137 |
| 2003/0231850 | A1 | 12/2003 | Filhaber et al. | |
| 2004/0042732 | A1 | 3/2004 | Bruns | |
| 2004/0131326 | A1* | 7/2004 | Miller | G02B 6/3672 385/137 |
| 2005/0069265 | A1* | 3/2005 | Lange | G02B 6/3885 385/63 |
| 2005/0254769 | A1 | 11/2005 | Qiu et al. | |
| 2009/0162012 | A1 | 6/2009 | Popp | |
| 2012/0033929 | A1* | 2/2012 | Horie | G02B 6/3612 385/135 |
| 2014/0263984 | A1* | 9/2014 | Hagen | G02B 6/4269 250/227.11 |
| 2015/0166395 | A1 | 6/2015 | Marjanovic et al. | |
| 2016/0170150 | A1* | 6/2016 | Fan | G02B 6/3574 385/22 |
| 2016/0271727 | A1 | 9/2016 | Courvoisier et al. | |
| 2017/0291850 | A1* | 10/2017 | Wada | C03C 23/0025 |
| 2019/0361174 | A1 | 11/2019 | Smith et al. | |
| 2021/0109296 | A1* | 4/2021 | Omura | G02B 6/3652 |
| 2021/0325612 | A1* | 10/2021 | Berger | G02B 6/3644 |

OTHER PUBLICATIONS

Francesco Venturini, Maurizio Sansotera, Rebeca Martinez Vazquez, Roberto Osellame, Giulio Cerullo, and Walter Navarrini, Micromanufacturing in Fused Silica via Femtosecond Laser Irradiation Followed by Gas-Phase Chemical Etching, Sep. 28, 2012, 11 pages.

Krishna Chaitanya Vishnubhatla, Nicola Bellini, Roberta Ramponi, Giulio Cerullo, and Roberto Osellame, Shape Control of Microchannels Fabricated in Fused Silica by Femtosecond Laser Irradiation and Chemical Etching, May 11, 2009, 11 pages.

S. Gross and M.J. Withford, Ultrafast-laser-inscribed 3D integrated photonics: challenges and emerging applications, Jul. 30, 2015, 21 pages.

Xiao Li, King Yuk Chan and Rodica Ramer, Fabrication of Through via Holes in Ultra-Thin Fused SilicaWafers for Microwave and Millimeter-Wave Applications, Mar. 20, 2018, 9 pages.

Extended European Search Report for European Patent Application No. 20213123.1 dated May 25, 2021. 9 pages.

Office Action for Chinese Patent Application No. 202011110623.6 dated Nov. 29, 2021. 8 pages.

Notification of Second Office Action for Chinese Patent Application No. 202011110623.6 dated Aug. 10, 2022. 9 pages.

Office Action for Chinese Patent Application No. 202011110623.6 dated Nov. 29, 2022. 9 pages.

* cited by examiner

Method 1000

GLASS FIBER HOLE PLATES FOR 2D FIBER COLLIMATORS AND METHODS FOR ALIGNMENT AND FABRICATION FOR OPTICAL SWITCHING APPLICATIONS

BACKGROUND

Optical communications use modulated light beams to convey information through optical fibers, free space, or waveguides. An optical circuit switch (OCS) is an all-optical, 3D switching matrix that may direct light from any input fiber N to any output fiber M by changing the angles of the mirrors in one or more micro-electromechanical system (MEMS) mirror arrays. The switch is designed for low insertion loss over a broad wavelength range, so each fiber may carry many wavelengths. The OCS is also designed for fast, reliable switching by the MEMS mirror arrays. Optical performance requirements include insertion loss, return loss, dynamic optical crosstalk, and static optical crosstalk.

Operation of an OCS depends on the fabrication of two-dimensional (2D) fiber collimators in which individual optical fibers are aligned with precision. Current fabrication techniques used to create hole plates which are used in fiber collimators have an upper limit in terms of the precision in which holes within the plate can be formed to house optical fibers and the depth to which these holes can be made. These techniques lead to imprecise holes being created in which fibers are inserted, leading to reduced optical performance for the OCS. As the holes are imprecise, the fiber is not precisely aligned with an intended path, leading to problems. In addition, to have a suitable amount of the fiber contained within the hole plate, it is often needed to stack two or more hole plates to form a hole or pathway for the fiber which is sufficiently long. A short attachment length limits the amount of force which can be exerted on the fiber before it is loosened or removed from the hole.

SUMMARY

The present disclosure provides a hole plate for use in a fiber collimator with a plurality of fiber pathways formed with high precision.

One aspect of the present disclosure provides a hole plate for use in a fiber collimator, the hole plate including a first side, a second side opposite of the first side, and a plurality of fiber pathways formed within the hole plate and extending from the first side to the second side. The hole plate can be made from a continuous material. Each fiber pathway of the plurality of fiber pathways can be adapted to receive a single optical fiber from a plurality of optical fibers. The sidewalls of each fiber pathway can be substantially perpendicular to the first side and the second side of the hole plate, and have substantially the same cross-sectional geometry as the single fiber.

Additional aspects of this disclosure provide a hole plate for use in a fiber collimator, the hole plate including a first side, a second side opposite of the first side, and a plurality of fiber pathways formed within the hole plate and extending from the first side to the second side. The hole plate can be made from a continuous material. Each fiber pathway of the plurality of fiber pathways can be adapted to receive a single optical fiber from a plurality of optical fibers. The sidewalls of each fiber pathway can be substantially perpendicular to the first side and the second side of the hole plate, and have substantially the same cross-sectional geometry as the single fiber. The plurality of optical fibers can be positioned within the plurality of fiber pathways. Each optical fiber can have a first end and second end. The hole plate can be formed of a material with a thermal expansion coefficient equal to or less than that of the optical fiber. The hole plate can be formed of material that matches the coefficient of thermal expansion of the optical fiber. The hole plate can be made of a silicon material. The plurality of fiber pathways can be formed through an etching technique. The fiber can be secured with an epoxy on one side of the hole plate. The etching technique used can be a femtosecond laser irradiation chemical etching (FLICE) technique. The plurality of fiber pathways can have a cross section that varies. The plurality of fiber pathways can be of a substantially fixed cylindrical shape.

Additional aspects of this disclosure provide an optical circuit switch (OCS) including a microelectromechanical systems (MEMS) mirror configured to receive a beam of light, a fiber collimator containing a hole plate, and a hole plate. The hole plate can include a first side, a second side opposite of the first side, and a plurality of fiber pathways formed within the hole plate and extending from the first side to the second side. The hole plate can be made from a continuous material. Each fiber pathway of the plurality of fiber pathways can be adapted to receive a single optical fiber from a plurality of optical fibers. The side walls of each fiber pathway can be substantially perpendicular to the first side and the second side of the hole plate, and have substantially the same cross-sectional geometry as a single fiber. The number of optical fibers can be equal to the number of MEMS mirrors. The fiber collimator can be formed using a femtosecond laser irradiation chemical etching (FLICE) technique.

Additional aspects of this disclosure provide fabricating a fiber collimator for use in an optical switching circuit including providing a plate, irradiating the plate with a laser, etching with a highly selective chemical bath a plurality of fiber pathways in the plate at the irradiated locations to form a hole plate. A plurality of optical fibers can be aligned within the plurality of fiber holes. The plurality of optical fibers can be secured within the hole plate. The plurality of optical fibers can be secured within the hole plate using epoxy. The coefficient of thermal expansion of the hole plate can be matched with the coefficient of thermal expansion of the plurality of optical fibers. The chemical bath can be a bath of hydrofluoric acid. The pulsed laser can be of any wattage of power. The pulsed laser can be more than 15 watts of power.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

This disclosure generally relates to methods, systems, and apparatuses to create precise and robust fiber collimators for use in the transmission of information within an optical circuit switch (OCS). In particular, the hole plate of the fiber collimator can be formed using microfabrication techniques, such as femtosecond laser irradiation followed by chemical etching, to form precise channels or fiber pathways in which fibers can be inserted. This allows for the hole plate to be made of a thicker material, allows for the optical fibers to be better aligned with their intended alignment, enables a more robust fiber collimator, and enables better performance of the OCS.

Figure 1:
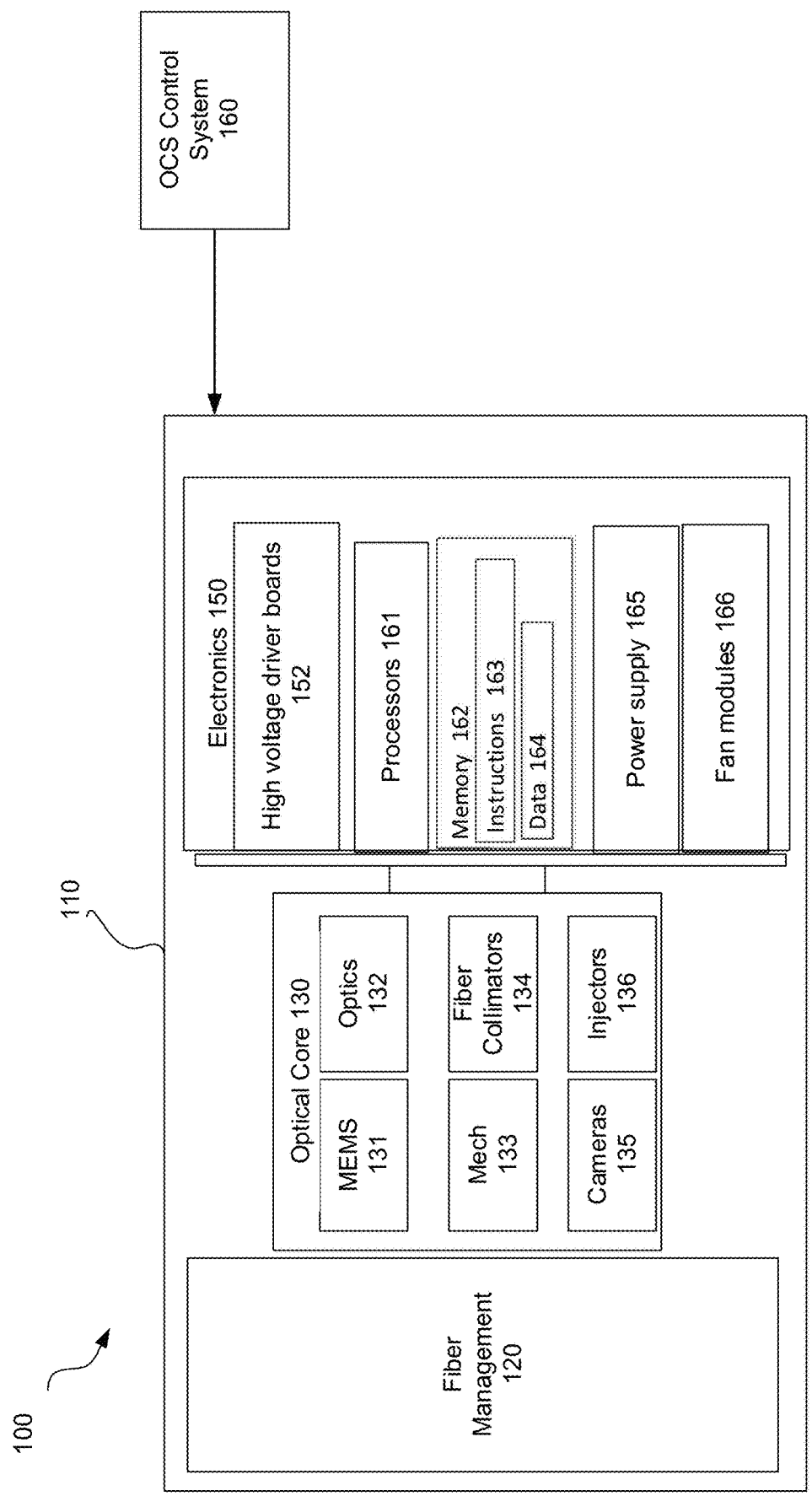
FIG. 1 is a block diagram of an example optical circuit switch according to aspects of the disclosure.

FIG. 1 illustrates an example OCS 100, such as may be used in a datacenter. The OCS 100 includes a structure such as chassis 110 supporting a number of components. In a front of the OCS chassis 110 are optical fiber connections, such as fiber management block 120. The OCS 100 may further include, such as in a middle, an optical core 130. The optical core houses MEMS 131, fiber collimators 134, optics 132, cameras 135, and injectors 136 and other mechanisms 133. A rear of the OCS 100 includes electronics 150, such as high voltage driver boards 152 for the MEMS, one or more processors 161, such as a CPU board, one or more memories 162 storing executable software, and power supplies 165 and fan modules 166. The chassis 110 interfaces with OCS control system 160. While a number of components are shown, it should be understood that such components are merely non-limiting examples, and that other components may additionally or alternatively be included.

There may be any number of input fibers and output fibers connected to the front of the OCS chassis 110. Inside the chassis 110, these fiber fanouts are spliced to the fiber collimators 134.

The fiber collimators 134 are lensed fiber arrays. Just as one example, the fiber collimators 134 may include tens or hundreds or more fibers. The fibers are assembled in a hole array that matches a MEMS array grid pattern, thereby forming a fiber array. The hole array may be made of silicon or other materials. The fiber array is attached to a mounting flange. A lens array is aligned and attached to the fiber array. Fiber and lens position errors are very tightly controlled.

The one or more processors 161 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of the OCS control system 160 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the OCS control system 160. Accordingly, references to a processor or computing device will be understood to include references to a collection of processors or computing devices or memories that may or may not operate in parallel.

Memory 162 may store information that is accessible by the processors 161, including instructions 163 that may be executed by the processors 161, and data 164. The memory 162 may be of a type of memory operative to store information accessible by the processors 161, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 163 and data 164 are stored on different types of media.

Data 164 may be retrieved, stored or modified by processors 161 in accordance with the instructions 163. For instance, although the present disclosure is not limited by a particular data structure, the data 164 may be stored in computer registers, in a relational database as a table having a plurality of different fields and records, XML documents, or flat files. The data 164 may also be formatted in a computer-readable format such as, but not limited to, binary values, ASCII or Unicode. By further way of example only, the data 164 may be stored as bitmaps comprised of pixels that are stored in compressed or uncompressed, or various image formats (e.g., JPEG), vector-based formats (e.g., SVG) or computer instructions for drawing graphics. Moreover, the data 164 may comprise information sufficient to identify the relevant information, such as numbers, descriptive text, proprietary codes, pointers, references to data stored in other memories (including other network locations) or information that is used by a function to calculate the relevant data.

The instructions 163 may be executed to selectively activate or deactivate particular pixel modulators within an injector of the optical circuit switch. Such activation or deactivation may effect the blocking or transmission of individual beams of light through the injector. It should be understood that the optical circuit switch 900 may include other components which are not shown but may be utilized in execution of the instructions 163.

Figure 2B:
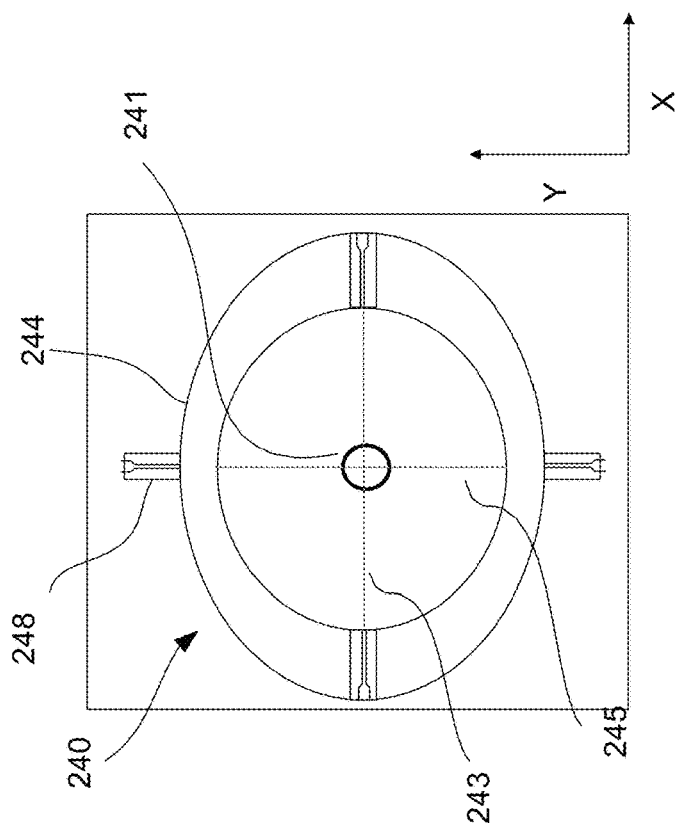
FIG. 2B is a diagram of a two-axis microelectromechanical system (MEMS) mirror assembly for use in an integrated optical assembly, according to aspects of the disclosure.
Figure 2A:
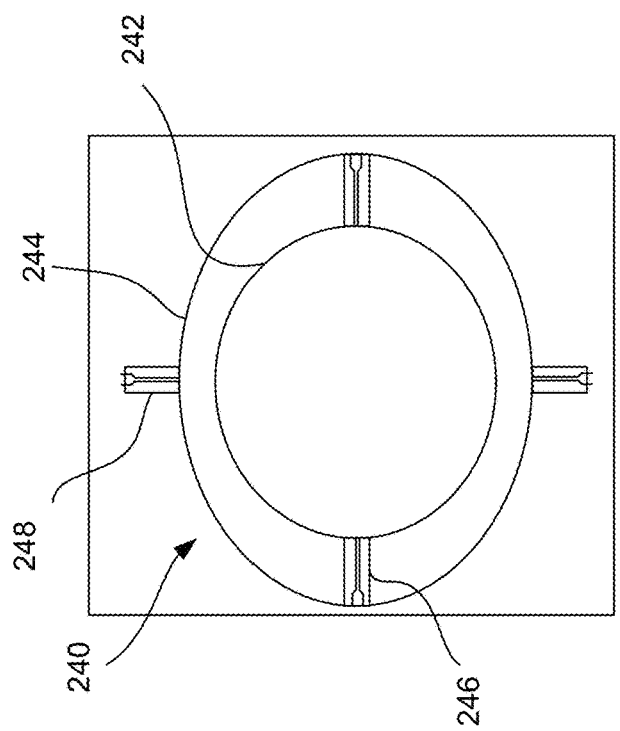
FIG. 2A is a diagram of a two-axis microelectromechanical system (MEMS) mirror assembly for use in an integrated optical assembly, according to aspects of the disclosure.

FIG. 2A illustrates an example MEMS mirror 240. The MEMS mirror 240 may be approximately 1 mm in size and highly reflective. For example, the MEMS mirror 240 may be coated with a highly reflective material, such as gold. The mirror 240 includes an inner portion 242 and an outer portion 244, wherein the inner portion is rotatable about a first axis and the outer portion is rotatable about a second axis. For example, the inner portion may rotate about inner torsion beams 246 actuated by a comb drive actuator. The outer portion may rotate about outer torsion beams 248 actuated by a comb drive actuator. The comb drive actuators may be high voltage, electro-static vertical comb drives which rotate the mirrors about the torsion beams. For example, the rotation may be approximately +/−1-10 degrees when a voltage ranging between 10 s of volts to hundreds of volts is applied across the electrodes.

FIG. 2B illustrates additional aspects of MEMS mirror 240. FIG. 2B illustrates the centroid of MEMS mirror 240, centroid 241. Centroid 241 may correspond with the center of mass of MEMS mirror 240. For example, when the density of the MEMS mirror is uniform, the center of mass and the centroid 241 would be at the same location. FIG. 2B also illustrates a first axis 243 of rotation, such as an x-axis. Similarly, FIG. 2B illustrates a second axis 245 of rotation, such as a y-axis. Rotation of the MEMS mirror about either axis 243 or axis 245 may be achieved through rotating torsion beam 246 or torsion beam 248 respectively. By actuation of all torsion beams attached to MEMS mirror 240, it is possible to move MEMS mirror 240 in a direction perpendicular to the plane formed by the two axes of rotation, axis 243 and axis 245, such as a z-axis. Thus, the MEMS mirror may be moved in at least three independent directions. The movement of the MEMS mirror in these three independent directions may also be referred to as tip, tilt, and piston actuation of the MEMS mirror. The amount of movement of the MEMS mirror may be tracked by the movement of centroid 241 with respect to three independent axes, such as an x-axis, y-axis, and z-axis.

In some examples, it may be necessary to adjust the positioning of one or more MEMS mirrors, such as MEMS mirror 240. As an example, it may be necessary to remove a MEMS mirror out of the path of a light beam. As another example, it may be necessary to remove one of the MEMS mirrors out of the field of view of a particular camera. Removing a MEMS mirror from the camera field of view may be referred to as "parking" of the MEMS mirror. Parking may be achieved by applying voltages to the driver elements capable of moving a MEMS mirror. However, the high voltage required to park a MEMS mirror may damage the driver elements associated with the MEMS mirror through more stress on electronic components and aging, increasing the likelihood of failure in the future. Additional methods and apparatuses to prevent the interference caused by an unwanted light beam are discussed below.

Figure 3:
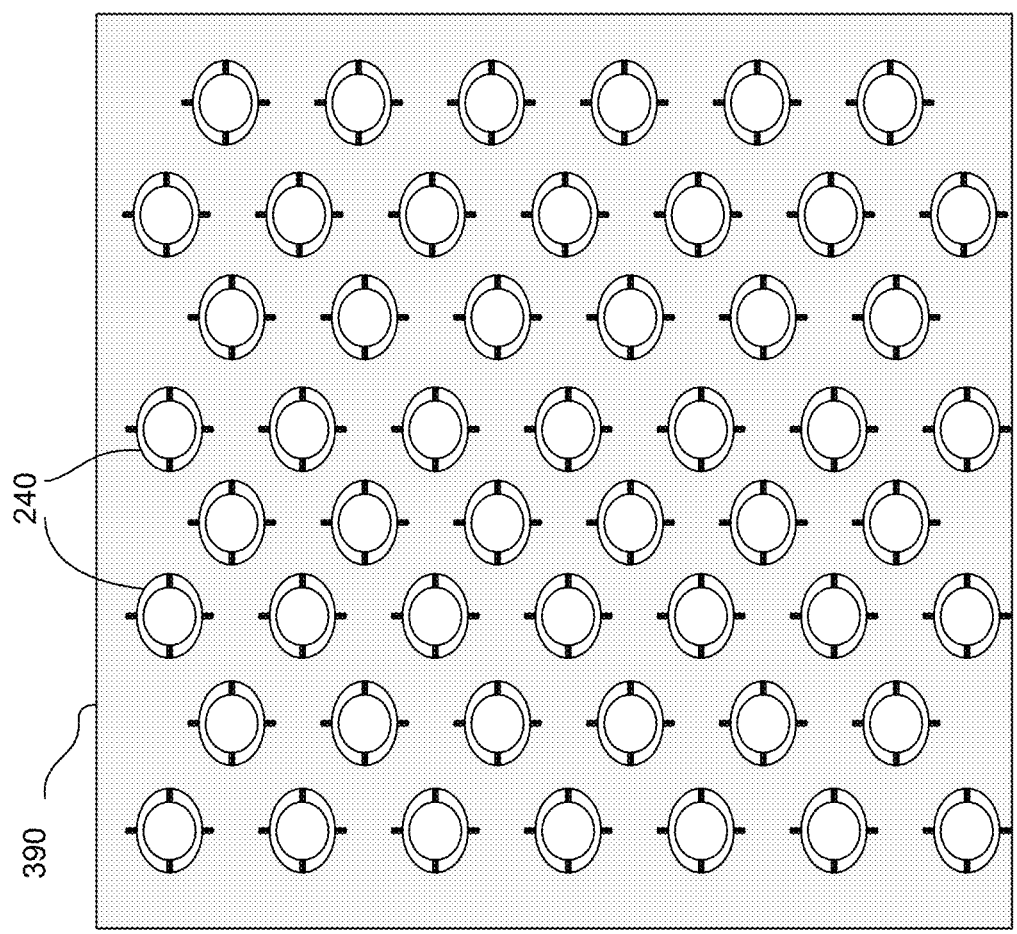
FIG. 3 is a diagram of a two-axis microelectromechanical system (MEMS) mirror assembly for use in an integrated optical assembly, according to aspects of the disclosure.

FIG. 3 illustrates an example die including an array of MEMS mirrors 240. Accordingly to some example, the MEMS die packages include MEMS mirror arrays, but in other examples any number of MEMS mirrors may be included. The die may be hermetically sealed inside a package with a window in its lid. Not all of the mirrors may be needed or used at a same time. For example, only the best mirrors and fibers in a MEMS mirror array may be selected to make an optical switch, which may be divided as a number of ports plus several spares.

Figure 4:
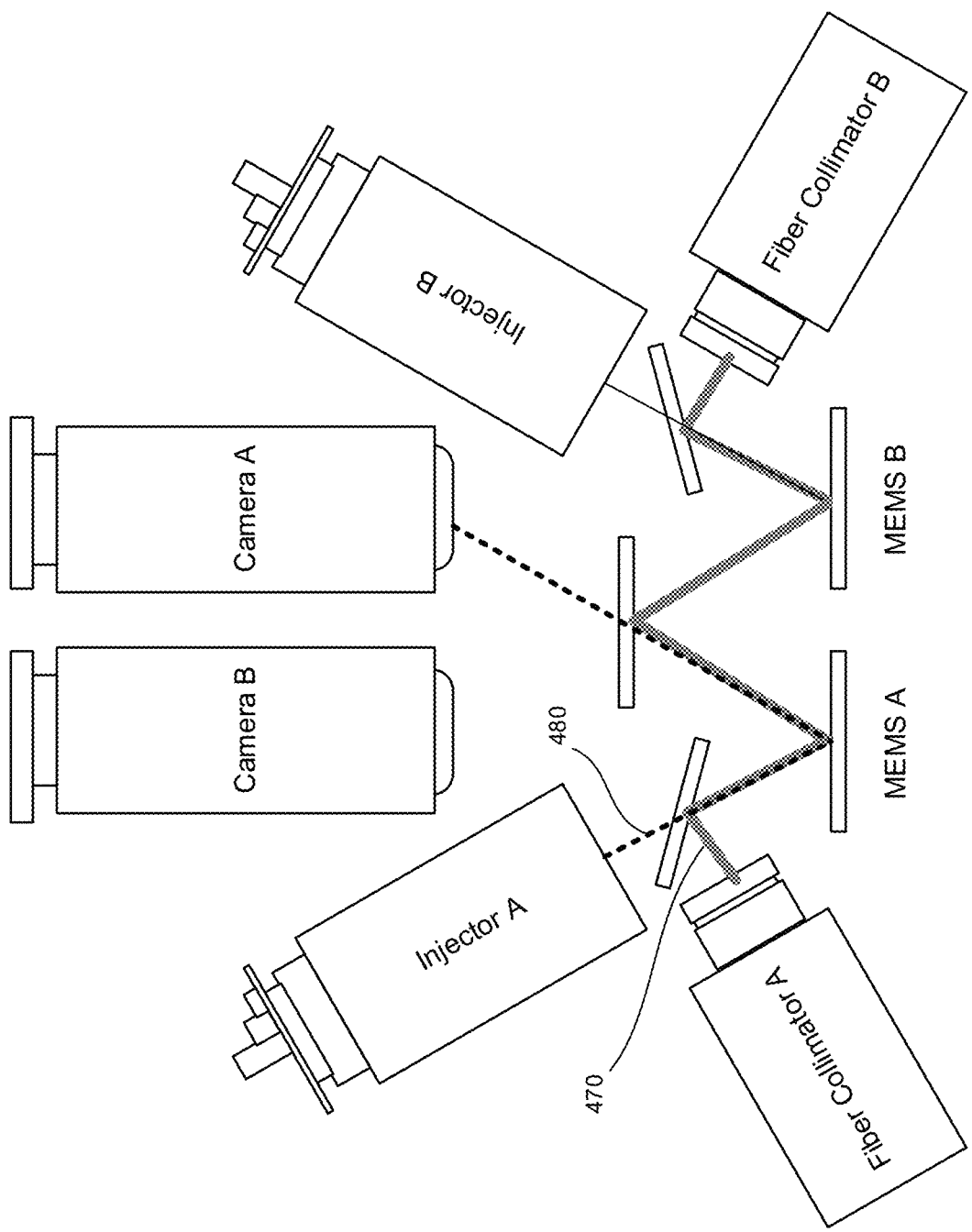
FIG. 4 is a diagram of an optical circuit switch, according to aspects of the disclosure.

FIG. 4 provides an example of a data optical path and a monitor optical path included in the optical core. On data path 470, traffic comes in as light input to fiber collimator A. All of the optics in the data path 470 may be designed for very low loss over a variety of wavelengths. The light travels along this path 470, and is reflected from MEMSA, then from MEMSB, then is coupled to output fiber collimator B. MEMS A and MEMS B may be just two MEMS mirrors of a larger array, such as illustrated in FIG. 3 and explained above. By rotating the mirrors in the array, light from any input fiber may be coupled to any output fiber. The injectors shine small laser beams on the MEMS. The cameras image the beams reflected from the MEMS to measure the mirror positions.

Monitor path 480 does not carry data, but provides information to a mirror control system about the positions of the mirrors. This may be done using, for example, an injector to shine small beams on each of the MEMS mirrors, and a camera to view the positions of the beams reflected from the MEMS. There may be a camera/injector pair for each MEMS.

Figure 5:
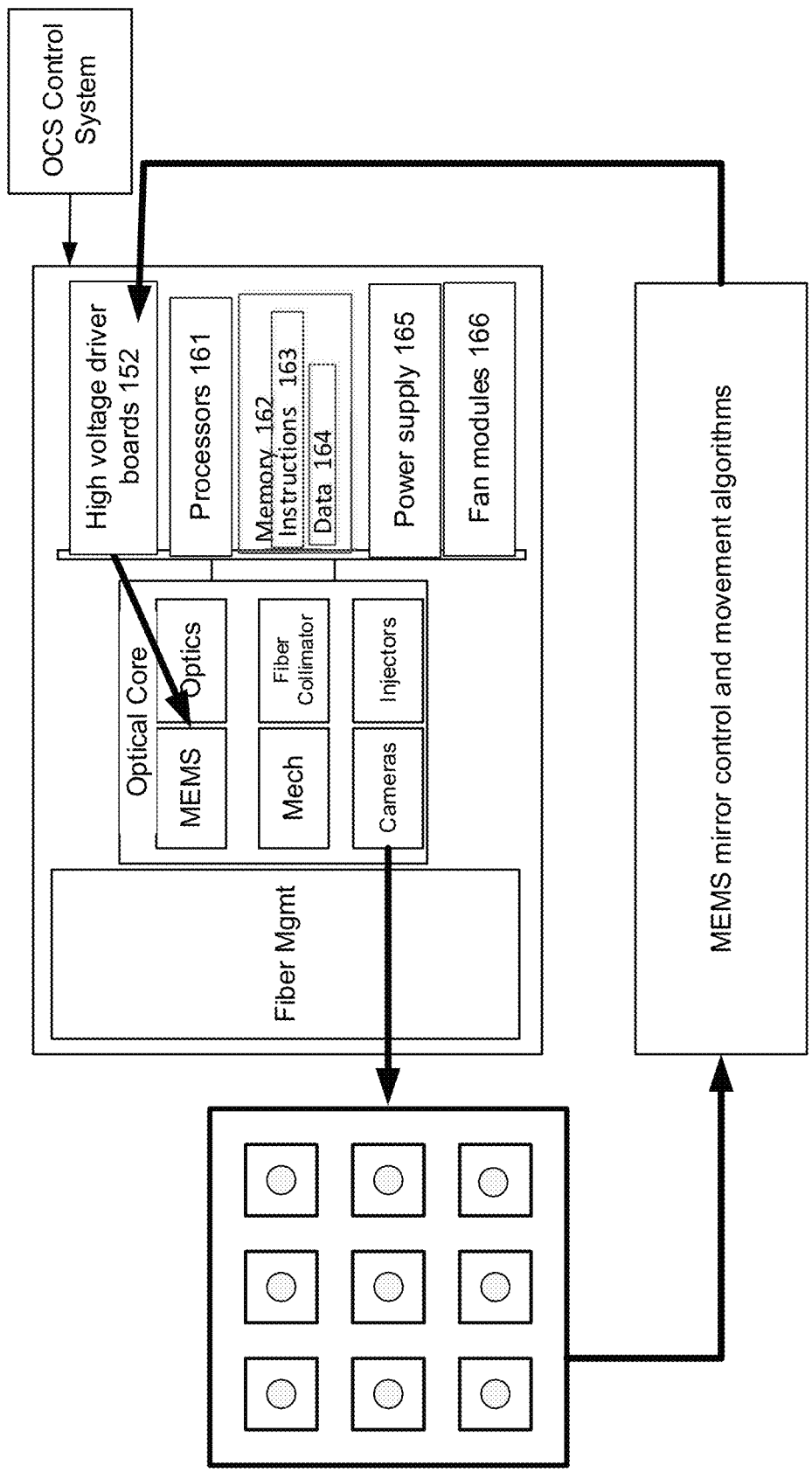
FIG. 5 is a diagram of a feedback in a mirror control loop according to aspects of the disclosure.

FIG. 5 illustrates an example mirror control loop. The OCS control system 160 tells the OCS what configuration it should be in. The mirror control loop handles the MEMS mirror control and movement algorithms based on the monitor path data, and then tells the high voltage drivers to move the mirrors.

As explained below with reference to FIGS. 6A-10, methods, apparatuses, and devices related to glass fiber hole plates for use in 2D fiber collimators are discussed. The use of hole plates for use in 2D fiber collimators or other optical performance equipment requires a high degree of precision in the fabrication of the hole plate to minimize both local and global error.

In some examples, the hole plate can be formed through a microfabrication or nanofabrication technique. Microfabrication and nanofabrication techniques include, without limitation, chemical etching, lithographical patterning, photolithography, bonding, molecular self-assembly, focused ion beam lithography, electron beam lithography, colloid monolayer lithography, molding, or drilling. Some of these techniques, although effective in the creation of 2D patterns on a surface, can be somewhat limited in their application to create true three-dimensional (3D) structures within a material.

In another example, a femtosecond laser irradiation followed by chemical etching (FLICE) technique can be used in the fabrication of the hole plate from a substrate or other block of material. The FLICE technique first applies a femtosecond laser irradiation to a material below the ablation threshold of that material. The intensity or amount of laser energy required to remove material though laser etching depends on the material, and is known as the ablation threshold. Femtosecond laser irradiation below this threshold creates an imprint of a microchannel into the substrate volume which is intended to be etched without directly etching the material itself. In the next step of the FLICE technique, the substrate which has been modified by laser irradiation can be placed within a chemical etching bath. The chemical etching bath can use, for example, a hydrofluoric (HF) acid, which is highly selective and only removes the region or volume of the substrate which has been modified or subjected to the laser irradiation. The chemical etching bath will remove the irradiated material from the substrate, creating a channel within the substrate.

One advantage of the FLICE fabrication technique is that various geometries can be created throughout the chosen substrate. Thus, the fabrication of 3-D geometries running through the material is possible. For example, it may be desirable to have an etched channel which is larger in one part of the substrate but narrower in other parts of the substrate. Another advantage of the FLICE technique is that it uses laser light, and thus very high precision can be achieved in the fabrication process. For example, it is possible to fabricate etched channels within a substrate with a precision of +/−1 µm. Yet another advantage is that the FLICE technique is maskless, rapid, scalable, and can be done at a lower cost than other techniques. Another advantage is that the repeatability of the FLICE technique allows for the same precision in the fabrication of a number of optical components, which allows for the upper and lower bounds of precision for the fabricated optical components to be known before they are fabricated. This allows for optical systems to be designed with known error bounds by using FLICE technique fabricated optical components. Another advantage of the FLICE technique is that it allows for precision channels to be fabricated in substrates that are much thicker substrates than would be possible by traditional deep reactive ion etching (DRIE) processes As discussed further below, the use of the technique in thicker substrates allows for the fabrication of more precise pathways for optical fibers in a single substrate rather than the use of multiple bonded substrates, which will not perfectly align, to create a pathway for a fiber.

Figure 6A:
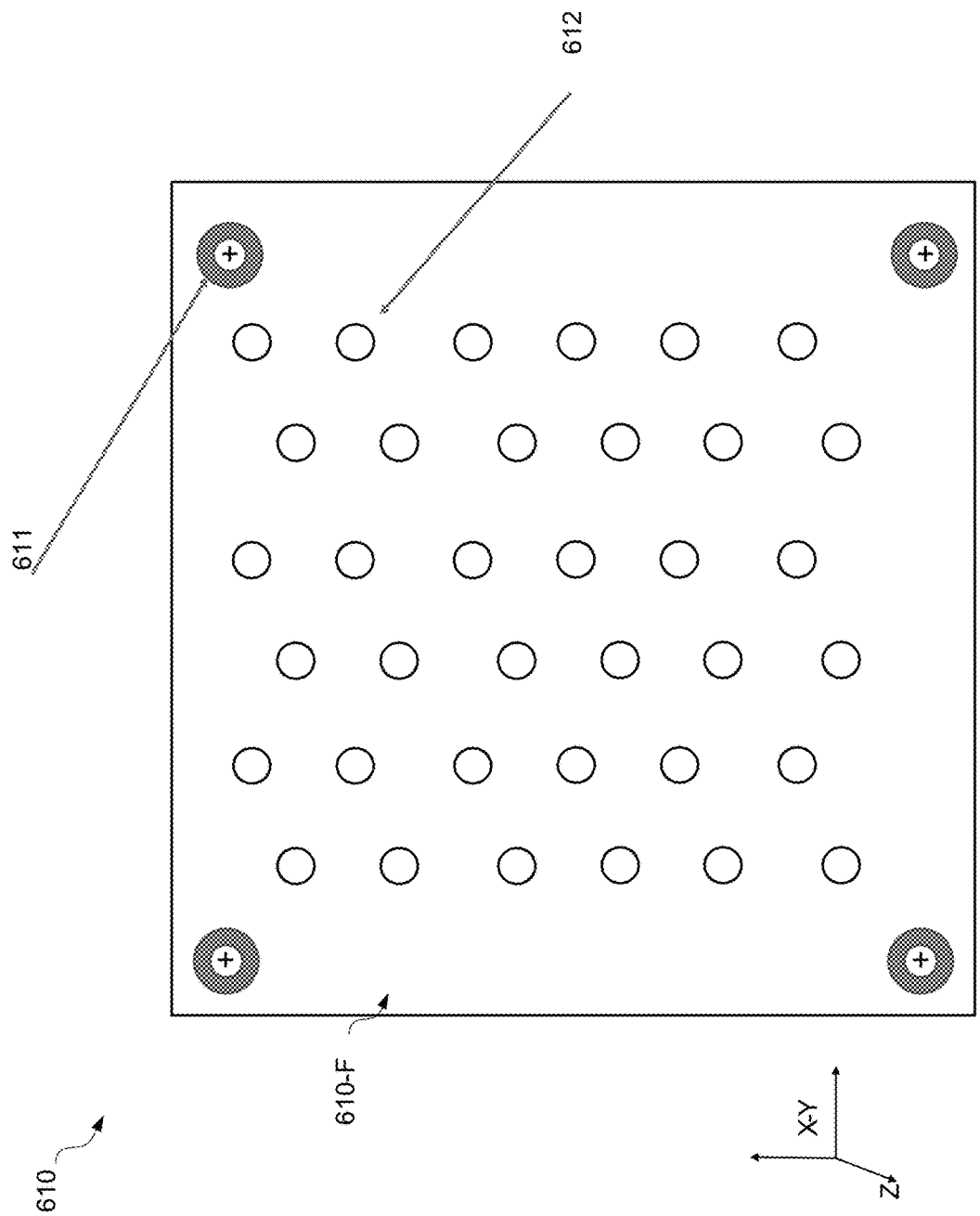
FIG. 6A is a diagram of a hole plate according to aspects of this disclosure.

FIG. 6A illustrates aspects of hole plate 610. FIG. 6A illustrates the hole plate 610, aligning locations 611, a fiber pathway 612, and a first side 610-F.

Hole plate 610 may have a first side, 610-F, from which the fiber pathways, such as fiber pathway 612 begins, and a second side (not illustrated), onto which the fiber pathways end. Thus a channel within can be formed within the hole plate 610 to act as a fiber pathway, such as fiber pathway 612. Each fiber pathway 612 may be created within the hole plate by a fabrication method to allow for a space through which optical fibers can be inserted with precision. For example, fiber pathway 612 can be formed using any of the fabrication techniques described above. Fiber pathway 612 can be of a thickness which allows a corresponding optical fiber to be inserted within it. For example, fiber pathway 612 can be a fixed percentage larger than the thickness of the optical fiber which it houses. In an example, the fiber pathway can be substantially cylindrical in shape, formed from the first side to the second side of the hole plate, with the radius of the cylinder being no larger than 1% of the radius of the optical fiber it is intended to house. In another example, the hole can have a diameter that is only one micron larger than the optical fiber for which it is fabricated. In another example, the fiber may have a diameter of 125 microns while the hole has a diameter of 126 microns in a hole plate of 1 mm. In other examples, the hole can be fabricated to be one micron larger than the diameter of the fiber selected for an optical application. The fiber pathways may have a thickness and uniformity to allow optical fibers to pass through them for use in the OCS. For example, the fiber pathways may be of a cylindrical shape, with a radius of the cylinder being on the order of a 100 microns, and the length of the cylinder running through the thickness of the hole plate 610.

Once formed, the fiber pathways can be modified by depositing an additional material which can also be different than the material from which hole plate 610 is made. Selectively modifying the fiber pathway in this manner may be desired to increase precision of inserting the fibers or for modifying other physical properties of the hole plate.

The fiber pathways, such as fiber pathway 612, may be formed in a grid pattern, such as that illustrated in FIG. 6A. The fiber pathways can be formed to align with other optical components of a fiber collimator, such as for example, a molded microlens array. While FIG. 6A illustrates a number of fiber pathways in a particular grid pattern, it should be understood that the hole plate 610 may include any number of fiber pathways arranged in any of a variety of patterns. The number of fiber pathways may correspond to the number of MEMS mirrors in the OCS for example.

Hole plate 610 may have a thickness based on the strength requirements of the hole plate. For example, the hole plate may be approximately 1 mm. In other examples, the hole plate may range from 0.5 mm to 5 mm in thickness. In some examples, a thicker substrate can be used as it is less susceptible to bending and other mechanical stresses. In some examples, through the use of a thick substrate, it is possible to have a larger attachment length for optical fibers. For example, compared to DRIE processes, which are limited to roughly 300 μm, a FLICE technique enables an attachment length of 1000 μm or more. In some examples, hole plate 610 can have a thickness which is several times the maximum fabrication thickness possible through DRIE processes—which allows for the fabrication of more precise pathways for optical fibers in a single substrate rather than creating a thicker hole plate by bonding multiple substrates which cannot perfectly align. In some examples, a thickness can be chosen based on the desired attachment length of a fiber within a fiber pathway, such as by the use of epoxy between the fiber and the walls of the fiber pathway.

The material from which the hole plate 610 is made can be chosen based on its thermal characteristics, coefficient of expansion, rigidity, suitability for etching, its durability, how error-prone it is based on a particular etching or fabrication technique, or other physical parameter. For example, the hole plate 610 can be made of silica glass, silicon, fused silica, glass, metal, or ceramics. In some examples, hole plate 610 can be made from a material which matches the coefficient of thermal expansion of an optical fiber intended to be placed within the hole plate. For example, a fused silica hole plate will have a close match to the coefficient of thermal expansion to fused silica cladded optical fibers. Matching the coefficient of thermal expansion ensures that the alignment of fibers within hole plate 610 is not affected by temperature changes. Further, in some examples, it may be desirable to match the coefficient of thermal expansion to ensure that there is no mechanical stress on the hole plate or fibers due to mismatched expansion or contraction of the hole plate and the optical fiber, The hole plate alignment locations 611 can be any location which can help align or secure the hole plate in a housing, such as within a fiber collimator. The alignment locations can be fiducials which simply indicate where the hole plate is intended to be installed within a larger apparatus. The alignment locations or fiducials take on a shape or marking, such as for example, a circle, crosshair or a star. The alignment locations can also be modifications to the hole plate at certain locations to allow the hole plate to be physically secured to a housing. In some examples, the alignment locations can be channels that are formed through the thickness of the hole plate, such as screw channels or pin channels. In other examples, the alignment location can be an area of the hole plate which is modified to have a rough surface or an indent, to allow for an increased surface area for better adhesion between the hole plate and another surface.

In some examples, the alignment locations can be formed when a prospective material from which the hole plate is made is given an approximate shape. In some examples, the hole plate can be given a precise shape from the approximate shape through the use of the FLICE technique or other etching techniques. In other examples, the alignment locations can be formed in the same step as giving the hole plate a precise shape. In other examples, the alignment locations can be formed during the formation of the fiber pathways. Forming the alignment locations when the fiber pathways are formed can ensure that the set of fiber pathways are aligned properly relative to other components of the OCS, such as for example, a fiber collimator. These markers can enable high precision alignment of the hole plate during installation by, for example, positioning the hole plate by viewing the alignment locations under a microscope.

In some examples, the alignment location also allows for the hole plate to be physically secured to a housing. The alignment locations may be fabricated using the techniques described above to create a surface which allows the hole plate to be secured to another surface. For example, the alignment locations can be etched to create a rough surface, to allow adhesive to be applied on a larger surface area and in turn providing more strength to better secure the hole plate. In other examples, it is possible to secure the hole plate using physical methods, such as screws at locations marked by the alignment locations. The alignment locations can be formed on either the first side or the second side, or both, of the hole plate 610.

Figure 6B:
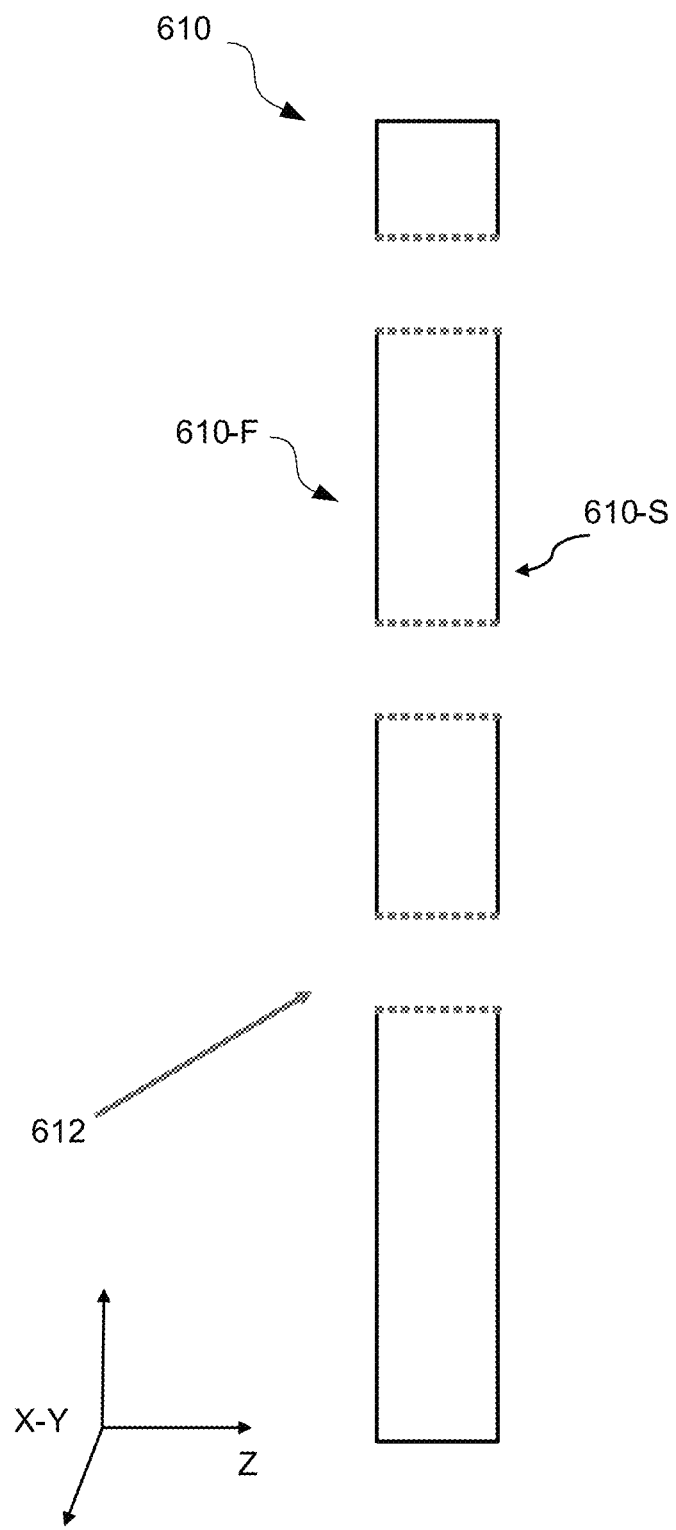
FIG. 6B is a diagram of a hole plate according to aspects of this disclosure.

FIG. 6B illustrates another view of hole plate 610. Hole plate 610 has a length, width, and thickness. FIG. 6B illustrates a first side, 610-F, and a second side, 610-S, of the hole plate 610. The first and second sides may be formed along the length of the hole plate 610. Also illustrated in dotted lines are representations of the fiber pathways through the thickness of the hole plate 610, such as fiber pathway 612. Walls of the pathways may be substantially perpendicular to the first and/or second side of the hole plate. The walls of the fiber pathway, when measured from either the first or second side of the hole plate, can be formed to be between 89 and 91 degrees—a total difference of less than 15 milliradians.

Figure 7A:
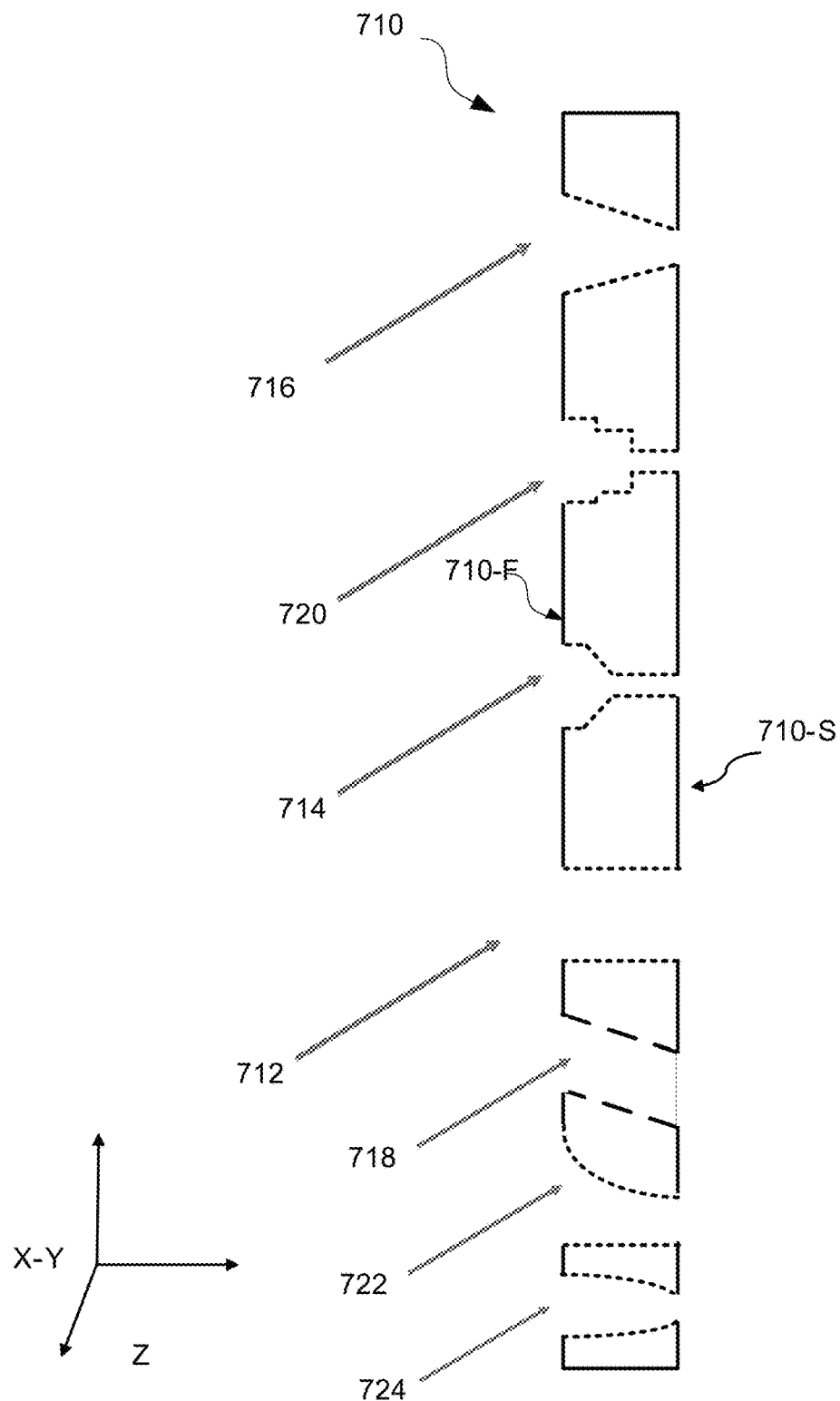
FIG. 7A is a diagram of a hole plate according to aspects of this disclosure.

FIG. 7A illustrates a side view of a hole plate 710 including a first side 710-F, a second side 710-S, and fiber pathways 712-724. The first side 710-F includes a first surface and the second side 710-S includes a second surface. As shown in FIG. 7A, the fiber pathways can be formed from any arbitrary 3D geometry which allows for the fiber pathways to have complex shapes and be formed to accommodate a wide variety of design parameters. Fiber pathway 712 is cylindrical and has substantially a fixed radius. Fiber pathway 714 is funnel-shaped. Fiber pathway 714, by virtue of being funnel-shaped, can allow for easier insertion of the fiber into the fiber pathway yet ensure that the fiber is aligned and substantially perpendicular to the second side of the hole plate. Fabrication of this geometry can reduce the possibility of the fiber breaking or snagging when being inserted into the fiber pathway. Fiber pathway 716 is frustoconical. The fiber pathway 716 can also allow for a fiber to be more easily inserted therein. Fiber pathway 718 is shaped conically but formed at an angle to both sides of the hole plate 710. These fiber pathways are illustrative to show the variety of complex geometries which can be formed for the fiber pathways. Fiber pathway 720 is shaped as a stepwell with "steps" or side walls that are either parallel or perpendicular to the sides of the hole plate. Fiber pathway 720 can be made with any number of steps. Fiber pathway 722 is shown with a curved wall forming one pathway with a substantially straight wall forming the other side of the pathway. It should be understood that although fiber pathway 722 is a 2D view of the fiber pathway, the curved wall exists in three dimensions. Fiber pathway 724 is shown with two curved walls forming the pathway. Although shown as convex curved walls, it is possible to form the curved walls in other curvatures, such as concave curved walls in other examples.

Figure 7B:
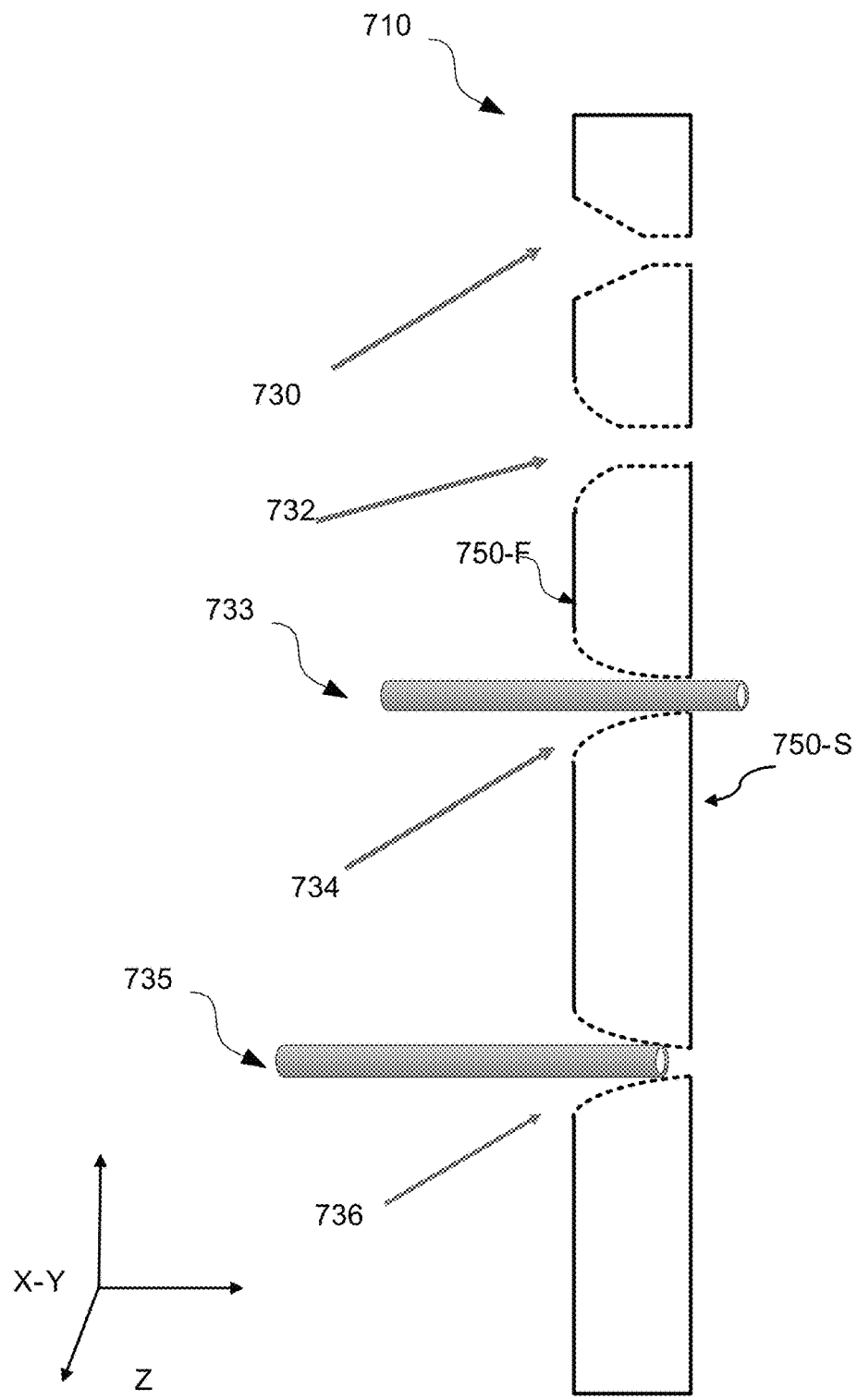
FIG. 7B is a diagram of a hole plate according to aspects of this disclosure.

FIG. 7B illustrates a side view of a hole plate 750 including a first side 750-F, a second side 750-S, a fiber 733, a fiber 735, and fiber pathways 730-736. The first side 750-F includes a first surface and the second side 750-S includes a second surface. FIG. 7B illustrates example fiber pathways which can be formed in the hole plate 750. Fiber pathway 730 is partially frustoconical and partially cylindrically shaped. Fiber pathway 732 is shaped with curved sidewalls leading to a cylindrically shaped portion. Fiber pathway 734 is shaped with curved walls forming a pathway with a wider opening on the first side 750-F and a narrower opening on the second side 750-S. Fiber pathway 734 can have a central axis substantially perpendicular to the first side 750-F and the second side 750-S. Fiber pathway 736 is shaped similarly to fiber pathway 734. In some examples, the narrowest portion of fiber pathway 734 may be slightly larger than the width of fibers used in the glass fiber hole plate, which would in turn allow a fiber, such as fiber 733, to pass through fiber pathway 734. In other examples, the narrowest portion of fiber pathway 736 may be narrower than the width or diameter of fibers used in the glass fiber hole plate, which would in turn prevent a fiber, such as fiber 735 from passing through the fiber pathway 734. In these examples, the shape of the pathway can allow for the fiber to be more easily inserted into the fiber pathway 734 without the fiber being damaged. Fiber pathway 736 can also allow fiber 735 to be "centered" within the fiber pathway. The shape of fiber pathways 730-736 can also be described as a volume of rotation around the respective axes of the fiber pathways.

Figure 8:
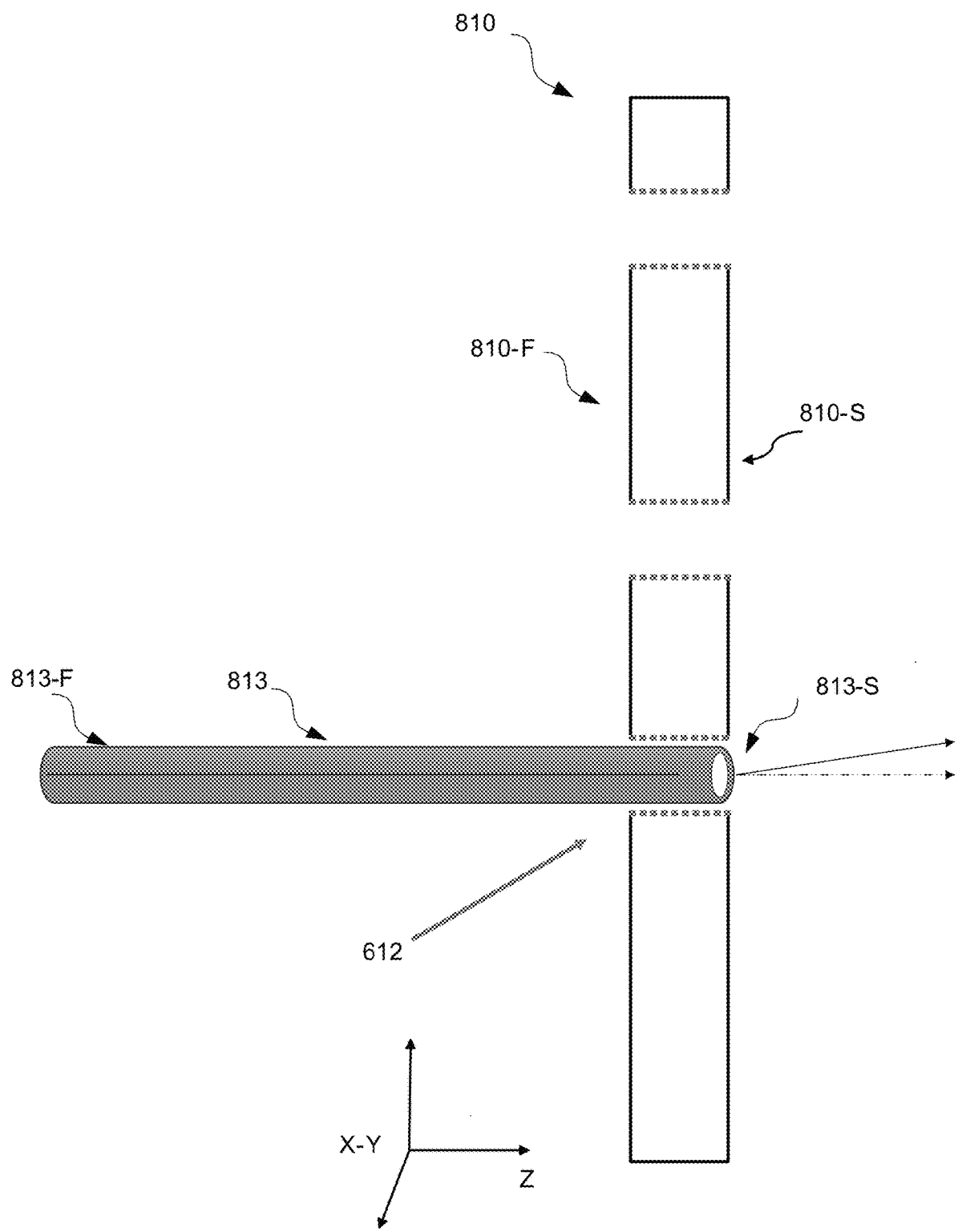
FIG. 8 is a diagram of a hole plate according to aspects of this disclosure.

FIG. 8 illustrates a side view of a hole plate 810 having a first side 810-F, a second side 810-S, a fiber pathway 812, a fiber 813. The first side 810-F includes a first surface and the second side 810-S includes a second surface. The fiber 813 has a first end 813-F and a second end 813-S. Fiber 813 can be an optical fiber capable of carrying light and configured to carry data through the transmission of light. The optical fiber can be fixed within the grid plate through the use of epoxy or similar material on the first side or second side of the hole plate 810. Fiber 813 also has a central axis indicated by a solid unlabeled line in FIG. 8. Fiber 813 is shown inserted within the fiber pathway 812, with the second end of the fiber substantially aligned with the second side or surface of the hole plate.

Also illustrated at the second end of fiber 813 in a dashed line is an "intended" alignment of the optical fiber. This intended alignment can be an alignment in which the central axis of the fiber 813 is aligned perfectly in the center of the fiber pathway and is perpendicular to the second side of the hole plate. Other intended alignments are possible based on the desired alignment of the fiber. The solid line shows the actual alignment of the fiber. The "intended" alignment can be the intended path that a path of light takes within an OCS once transmitted from an optical fiber. The alignment can reflect the actual path that light takes within an OCS once transmitted from an optical fiber.

Figure 9:
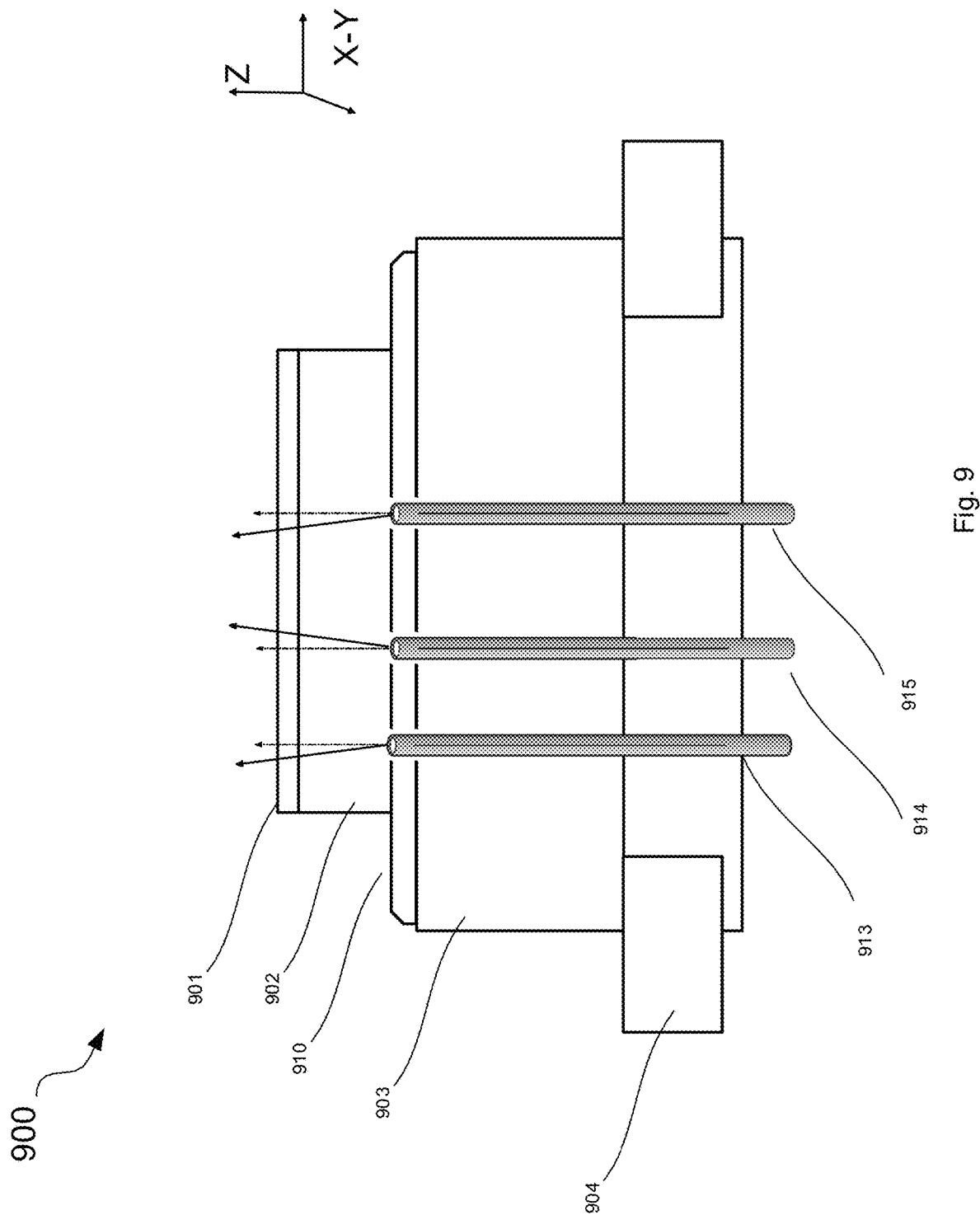
FIG. 9 is a diagram of a fiber collimator according to aspects of this disclosure.

FIG. 9 illustrates a cross sectional view of a fiber collimator 900. The fiber collimator can be used within a larger OCS setup. FIG. 9 illustrates a lens array 901, a spacer 902, a guide plate 903, a mount 904, a hole plate 910, and fibers 913, 914, 915. In some examples, fibers 913, 914, and 915 can all be of the same type of fiber, such as fiber 813. In other examples, the fibers 913-915 can be of different shapes, cross-sectional geometry, thicknesses, material, or have varying optical properties. If the fiber pathways are formed to be of varying geometries, the fibers can also be chosen to match the particular geometry of the fiber pathway. The lens array can include a number of precision molded glass lenslets corresponding to the number of fibers or number of MEMS mirrors. For example, guide plate 903 can be formed from fused silica, glass, or invar. Mount 904 can allow for the mounting of the 2D fiber collimator. Spacer 902 can be a block made from a glass material or any material which allows light to pass through it. Hole plate 910 can be a hole plate as described above, such as one similar to hole plate 810. Fibers 913-915 can be inserted within the fiber collimator 900 and aligned through the hole plate 910 as described above. Illustrated are dotted lines from the second ends of the fibers are intended alignments of the fibers. Also illustrated in the solid lines are the actual alignments of the fibers once inserted. As shown in FIG. 9, the alignments of each fiber can be slightly different as there can be some error in both the insertion of the fiber and the fabrication process. However, through the use of the techniques described herein, the inserted fibers are within the error threshold to enable the transmission of light from the fiber collimator to a MEMS mirror array, and to another fiber collimator which can receive the light, and in turn, the data encoded within the light. The hole plate 910 can be fixed to the guide plate 903 using the guide holes formed on guide plate 903, such as one similar to guide hole 611.

Referencing back to FIG. 4, fiber collimator A and/or fiber collimator B can be formed in a manner similar to fiber collimator 900 or use a hole plate similar to hole plate 610, hole plate 710, or hole plate 810. This has a number of advantages, such as for example: data path 470 can be designed to be even more accurate; larger tolerances in the accuracy of the movement of the MEMSs mirror array can be accommodated; data path 470 can be formed over longer distances; smaller MEMS mirrors arrays can be formed thereby allowing for more MEMs mirrors to be installed in the same area; the number of switches and pathways can be increased in an OCS system of the same size; the amount of information flowing through the OCS can be increased.

Figure 10:
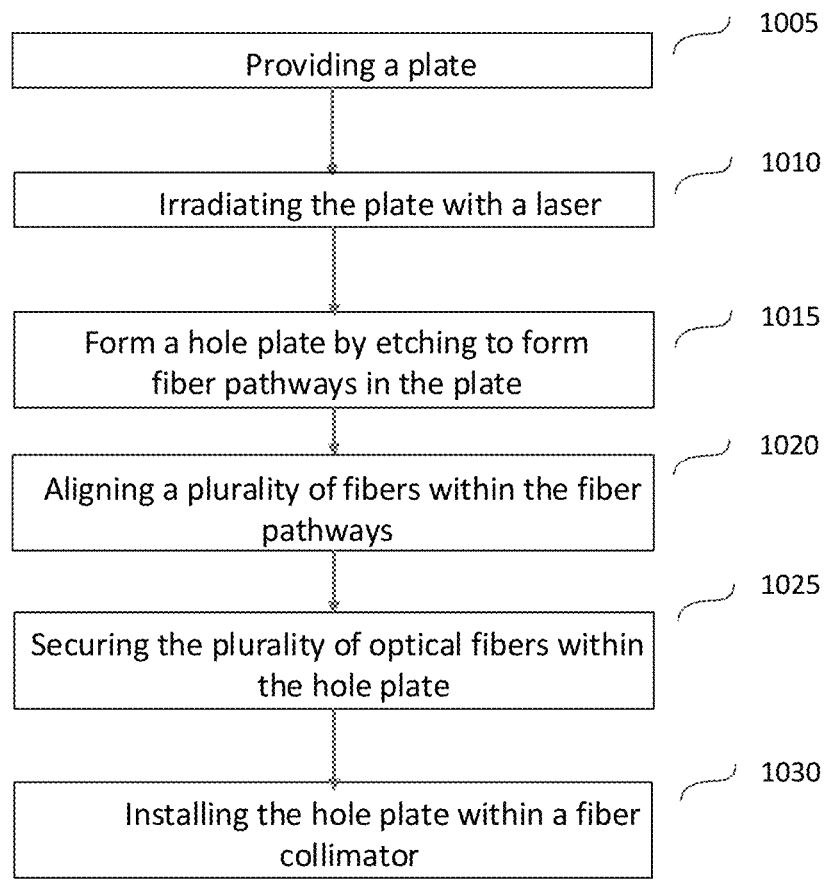
FIG. 10 is a flowchart of an example method according to aspects of the disclosure.

FIG. 10 illustrates a flowchart of an example method 1000 of configuring a hole plate with optical fibers. While the method 1000 is described below in a particular order, it should be understood that the operations may be performed in a different order or simultaneously. Moreover, operations may be added or omitted.

At block 1005, a plate can be provided. The plate can be made of a material capable of being modified by a femtosecond laser irradiation. In other examples, the plate can be chosen based on the selected etching or microfabrication process. The material can be fused glass silica for example. The material can also be chosen to have a coefficient of thermal expansion similar to that possessed by an optical fiber. The plate can be of a uniform thickness. The thickness can be chosen based on the fiber collimator into which the hole plate is intended to be inserted.

At block 1010, the plate can be irradiated with a laser. The laser can be an ultrashort pulse laser, such as a femtosecond laser. The laser can be of sufficient power to cause the plate material to be modified at the location. For example, the laser can be at least a 15 W laser. The laser can be focused to only irradiate the plate at desired locations. The laser can be focused to have a cross sectional area which is equal to the dimensions of the fiber pathway intended to be created within the plate. The irradiated points on the plate become modified due to the irradiation. Other geometries, such as those described in FIG. 7, can also be created by application of a corresponding irradiation at this step.

At block 1015, the irradiated plate can be placed within a chemical bath to form a hole plate. A highly selective chemical can be chosen based on the material forming the plate. For example, hydrofluoric acid can be chosen in the case of a fused glass silica. The highly selective chemical will only etch out the volume of material which has been irradiated by the laser. The areas not irradiated will not be affected. Thus, highly precise fiber pathways can be etched within the plate from one end to the other end, forming a hole plate.

At block 1020, a plurality of optical fibers can be aligned within the fiber pathways. As the fiber pathways can be created to be of nearly the same diameter or cross section of the fibers, it is possible to insert the fibers through mechanical methods. It is also possible at this step to first modify the block plate or the optical fibers to allow for easier insertion of the optical fibers within the fiber pathways. For example, it is possible to reduce the temperature of the fibers to cause them to contract and allow for them to be more easily inserted into the fiber pathway. It is also possible to increase the temperature of the grid plate to allow for the fiber pathways to be larger and thus more easily insert optical fibers. It is also possible to test the alignment of the fibers within the fiber pathways at this point before assembly into a fiber collimator or an OCS by transmitting light through the fibers and observing the trajectory or angle the light takes after exiting the fiber. In some examples, the fibers can transmit the light onto a photosensitive surface a known distance away from the fiber collimator. By observing where the light falls on the photosensitive surface, it is possible to ascertain the alignment of the fiber. The photosensitive surface can be connected to a computing device which enables a precise determination of where a beam of light falls. By following this process for each fiber, it is possible to know the alignment of each fiber. If certain fibers do not meet a desired alignment criteria, it is possible to realign those fibers or not use corresponding fiber pathways.

At block 1025, optical fibers can be secured and mechanically fixed within the fiber pathways. This can be done through the use of epoxy for example. In other examples, the fiber pathway can contain a "stop" at one end of the fiber pathway, which can allow the fiber to stop and not extend beyond the surface of the hole plate.

At block 1030, the hole plate can be installed or secured within a fiber collimator. It is possible to use other fiducials, such as a marking location formed on the hole plate to assist in the installation of the hole plate.

According to some example methods, various aspects of the fiber collimator systems may be evaluated. For example, the functionality of the hole plate and their efficacy can be tested and evaluated to determine error bounds and operational range for a specific fiber and MEMS mirror pair. Once determined, this information can be used as part of the algorithm which determines the movement of MEMS mirror and microcontrollers, and also determine the acceptable error bounds for the MEMS mirror within which the optical fiber pathway is operational. In some examples, a parameter known as the "random beam pointing error" or the angle a collimated beam in the fiber collimator array is pointing, can be measured. Thresholds for the random beam pointing error under which a fabricated fiber collimator must remain can be set based on, for example, the size of a MEMS mirror.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A hole plate for use in a fiber collimator comprising:
    a first side;
    a second side opposite the first side;
    one or more alignment locations configured to align the hole plate with the fiber collimator such that the hole plate can be connected to the fiber collimator; and
    a plurality of fiber pathways formed within the hole plate and extending from the first side to the second side, wherein:
        the hole plate is made from a continuous material,
        each fiber pathway of the plurality of fiber pathways is adapted to receive a single, unaltered optical fiber from a plurality of optical fibers,
        at least one fiber pathway of the plurality of the fiber pathways has a variable cross section, the variable cross section changing along a length of the at least one fiber pathway, and
        a narrowest portion of the at least one fiber pathway is narrower than a diameter of the optical fibers, such that the unaltered optical fiber is prevented from passing through the at least one fiber pathway.

2. The fiber collimator of claim 1 wherein the plurality of optical fibers positioned within the plurality of fiber pathways, each optical fiber with a first end and second end.

3. The fiber collimator of claim 1, wherein the hole plate is formed of material with a thermal expansion coefficient equal to or less than the optical fiber.

4. The fiber collimator of claim 1, wherein the hole plate is formed of material that matches the coefficient of thermal expansion of the optical fiber.

5. The fiber collimator of claim 1 wherein the hole plate is made of a silicon material.

6. The fiber collimator of claim 5 wherein the plurality of fiber pathways are formed through an etching technique.

7. The fiber collimator of claim 6 wherein the fiber is secured with an epoxy on one side of the hole plate.

8. The fiber collimator of claim 6 wherein the etching technique is a femtosecond laser irradiation chemical etching (FLICE) technique.

9. The fiber collimator of claim 8 wherein the plurality of fiber pathways are substantially of a fixed cylindrical shape.

10. The fiber collimator of claim 1 wherein at least one fiber pathway of the plurality of the fiber pathways is frustoconical shaped, funnel shaped, or contains steps.

11. The hole plate of claim 1, wherein the length extends from the first side to the second side.

12. An optical circuit switch (OCS) comprising:
    a microelectromechanical systems (MEMS) mirror configured to receive a beam of light; and
    a fiber collimator containing a hole plate, the hole plate comprising:
        a first side;
        a second side opposite the first side;
        one or more alignment locations configured to align the hole plate with the fiber collimator such that the hole plate can be connected to the fiber collimator; and
        a plurality of fiber pathways formed within the hole plate and extending from the first side to the second side;
        wherein:
            the hole plate is made from a continuous material,
            each fiber pathway of the plurality of fiber pathways is adapted to receive a single, unaltered optical fiber from a plurality of optical fibers,
            each fiber pathway of the plurality of the fiber pathways has a variable cross section, the variable cross section changing along a length of the at least one fiber pathway, and
            a narrowest portion of the at least one fiber pathway is narrower than a diameter of the optical fibers, such that the unaltered optical fiber is prevented from passing through the at least one fiber pathway.

13. The optical circuit switch of claim 12 wherein the number of optical fibers is equal to the number of MEMS mirrors.

14. The OCS of claim 12 wherein at least one fiber pathway of the plurality of the fiber pathways is frustoconical shaped, funnel shaped, or contains steps.

15. The OSC of claim 12, wherein the length extends from the first side to the second side.

16. A hole plate for use in a fiber collimator comprising:
    a first side;
    a second side opposite the first side;
    one or more alignment locations configured to align the hole plate with the fiber collimator such that the hole plate can be connected to the fiber collimator; and
    a plurality of fiber pathways formed within the hole plate and extending from the first side to the second side, wherein:
        the hole plate is made from a continuous material,
        each fiber pathway of the plurality of fiber pathways is adapted to receive a single, unaltered optical fiber from a plurality of optical fibers, and
        side walls of each fiber pathway are substantially perpendicular to the first side and the second side of the hole plate, and have a variable cross-sectional geometry, and
        a narrowest portion of each fiber pathway of the plurality of fiber pathways is narrower than a diameter of the optical fibers, such that the unaltered optical fiber is prevented from passing through the at least one fiber pathway.

17. The hole plate of claim 16, wherein the one or more alignment locations include a rough surface or an indent configured to increase contact area between the one or more alignment locations and another surface.

18. The hole plate of claim 16, wherein the one or more alignment locations are channels formed through a thickness of the hole plate.

19. The hole plate of claim 18, wherein the channels are configured to receive a coupling mechanism configured to attach the hole plate to the fiber collimator.

\* \* \* \* \*